Figure 1:
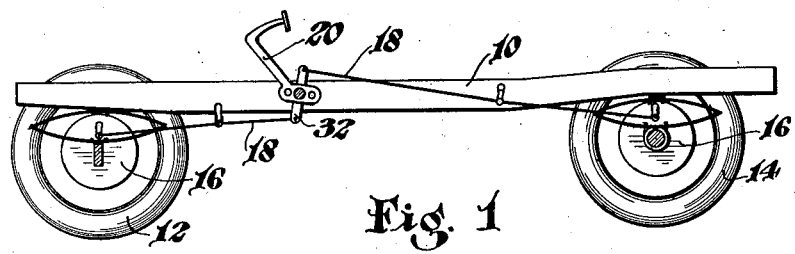

July 29, 1930.  W. J. ANDRES  1,771,832
BRAKE OPERATING MECHANISM
Filed Oct. 15, 1928

INVENTOR.
Wm. J. Andres
BY
ATTORNEY

Patented July 29, 1930

1,771,832

UNITED STATES PATENT OFFICE

WILLIAM J. ANDRES, OF SOUTH BEND, INDIANA, ASSIGNOR TO BENDIX BRAKE COMPANY, OF SOUTH BEND, INDIANA, A CORPORATION OF ILLINOIS

BRAKE-OPERATING MECHANISM

Application filed October 15, 1928. Serial No. 312,465.

This invention relates to brakes, and is illustrated as embodied in part of the operating mechanism for a set of four-wheel automobile brakes. An object of the invention is to provide simple and effective means for equalizing the pressures on the front and rear brakes or their equivalents.

Having this object in mind, the embodiment of the invention shown in the drawing includes a pivoted operating lever such as the usual service brake pedal, which has thrust parts on opposite sides of its fulcrum which are received in a slot in a double lever connected to the brakes or the like. Preferably the thrust parts are rollers or the like mounted between arms formed by forking the end of the lever.

Figure 2:
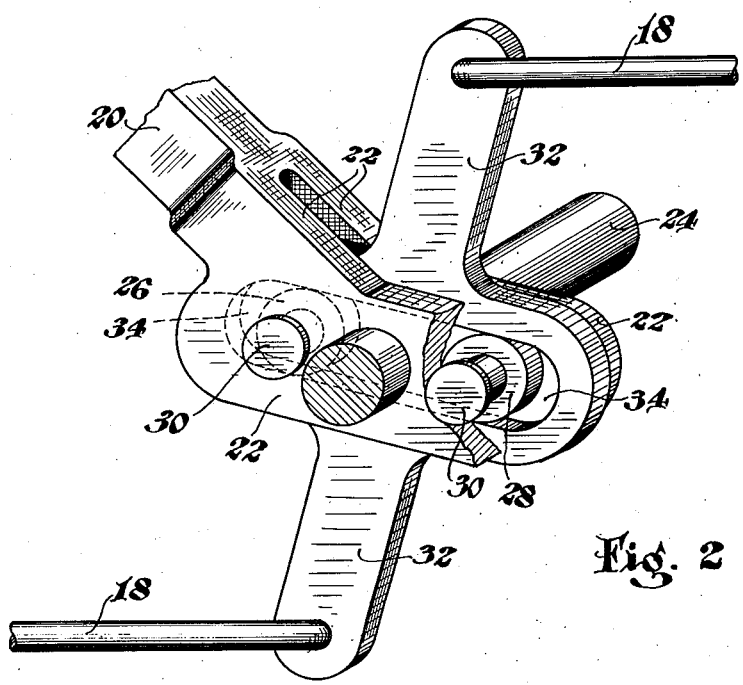

The above and other objects and features of the invention, including various novel and desirable details of construction, will be apparent from the following description of one illustrative embodiment shown in the accompanying drawing, in which:

Figure 1 is a diagrammatic longitudinal section through an automobile chassis, showing the brake-operating connections; and Figure 2 is a partial perspective view showing the lower end of the brake pedal, together with associated parts.

The chassis shown includes a frame 10 and front and rear road wheels 12 and 14 having brakes 16 operated by suitable force-transmitting means such as brake rods 18. The brakes or their equivalent are operated by a lever such as a novel pedal 20, forked at its lower end to form arms 22 oscillatably mounted on a pivot 24, ordinarily carried by a portion of the chassis or a part fixedly attached thereto.

On opposite sides of pivot 24 there are two thrust parts, such as anti-friction rollers 26 and 28 mounted between arms 22 by means such as pivot pins 30. Members 18 extend in opposite directions from the upper and lower ends of a double lever 32 arranged between arms 22, and which has an enlarged intermediate portion formed with a transverse slot 34 embracing rollers 26 and 28 and encircling pivot 24.

In operation, actuation of the pedal 20 by the operator serves through the thrust rollers 28 to actuate the double arm lever 32, pivot 24 acting as a fulcrum for the pedal lever. Lever 32 in turn also fulcrums on the pivot 24 to actuate the respective pull rods 18. By virtue of the transverse slot 34 in the lever 32 the forces transmitted to the pull rods are balanced inasmuch as the lever is free to slide laterally over the rollers 26 and 28.

While one illustrative embodiment has been described in detail, it is not my intention to limit the scope of the invention to that particular embodiment, or otherwise than by the terms of the appended claims.

I claim:

1. Operating mechanism comprising, in combination, a lever mounted on a fixed pivot and having thrust parts on opposite sides of said pivot, a double operated lever extending generally at right angles to the line connecting the two thrust parts and said pivot and having between its ends a transverse slot slidably embracing said thrust parts and encircling said pivot, and force-transmitting means connected to opposite ends of the operated lever and extending in opposite directions therefrom.

2. Operating mechanism comprising, in combination, a pivoted operating lever having transversely-spaced thrust parts, a double operated lever extending generally at right angles to the line connecting the two thrust parts and having between its ends a transverse slot slidably embracing said thrust parts, and force-transmitting means connected to opposite ends of the operated lever and extending in opposite directions therefrom.

3. Operating mechanism comprising, in combination, a pivot, a lever having a forked end forming spaced parallel arms fulcrumed intermediate their length on said pivot, thrust parts mounted between said arms on opposite sides of the pivot, and an operated lever received between said arms and having a transverse slot slidably embracing said parts and encircling said pivot.

4. Operating mechanism comprising, in combination, a lever having a forked portion forming spaced parallel arms, spaced thrust parts mounted between said arms, and an operated lever received between said arms and having a transverse slot slidably embracing said parts.

5. Operating mechanism comprising, in combination, a pivot, a lever having a forked end forming spaced parallel arms fulcrumed intermediate their length on said pivot, thrust rollers mounted between said arms, on opposite sides of the pivot, and an operated lever received between said arms and having a transverse slot slidably embracing said rollers and encircling said pivot.

6. Operating mechanism comprising, in combination, a lever having a forked portion forming spaced parallel arms, spaced thrust parts mounted between said arms, and an operated lever received between said arms and having a transverse slot slidably embracing said parts, together with force-transmitting connections extending in opposite directions from the opposite ends of the operated lever.

In testimony whereof, I have hereunto signed my name.

WILLIAM J. ANDRES.